H. M. PATCH.
CHANGE SPEED MECHANISM FOR AUTOMOBILES.
APPLICATION FILED OCT. 14, 1914.

1,273,266.

Patented July 23, 1918.
2 SHEETS—SHEET 1.

WITNESSES:
Charles L. Reynolds.
E. Peterson.

INVENTOR
Harry M. Patch
BY
Pierre Barnes
ATTORNEY

H. M. PATCH.
CHANGE SPEED MECHANISM FOR AUTOMOBILES.
APPLICATION FILED OCT. 14, 1914.

1,273,266.

Patented July 23, 1918.
2 SHEETS—SHEET 2.

WITNESSES:
Charles L. Reynolds.
E Peterson.

INVENTOR
Harry M. Patch
BY
Pierre Barnes
ATTORNEY

UNITED STATES PATENT OFFICE.

HARRY M. PATCH, OF SEATTLE, WASHINGTON.

CHANGE-SPEED MECHANISM FOR AUTOMOBILES.

1,273,266.

Specification of Letters Patent.

Patented July 23, 1918.

Application filed October 14, 1914. Serial No. 866,581.

*To all whom it may concern:*

Be it known that I, HARRY M. PATCH, a citizen of the United States, residing at Seattle, in the county of Seattle and State of Washington, have invented certain new and useful Improvements in Change-Speed Mechanism for Automobiles, of which the following is a specification.

This invention relates to change-speed mechanism for automobiles; and its object is the improvement of such mechanism whereby the operations of varying the speed or changing the direction of the motion of the driven elements of the mechanism may be more effectually and conveniently accomplished. The invention consists in the novel construction and combination of parts, as will be hereinafter described and claimed.

Figure 1:
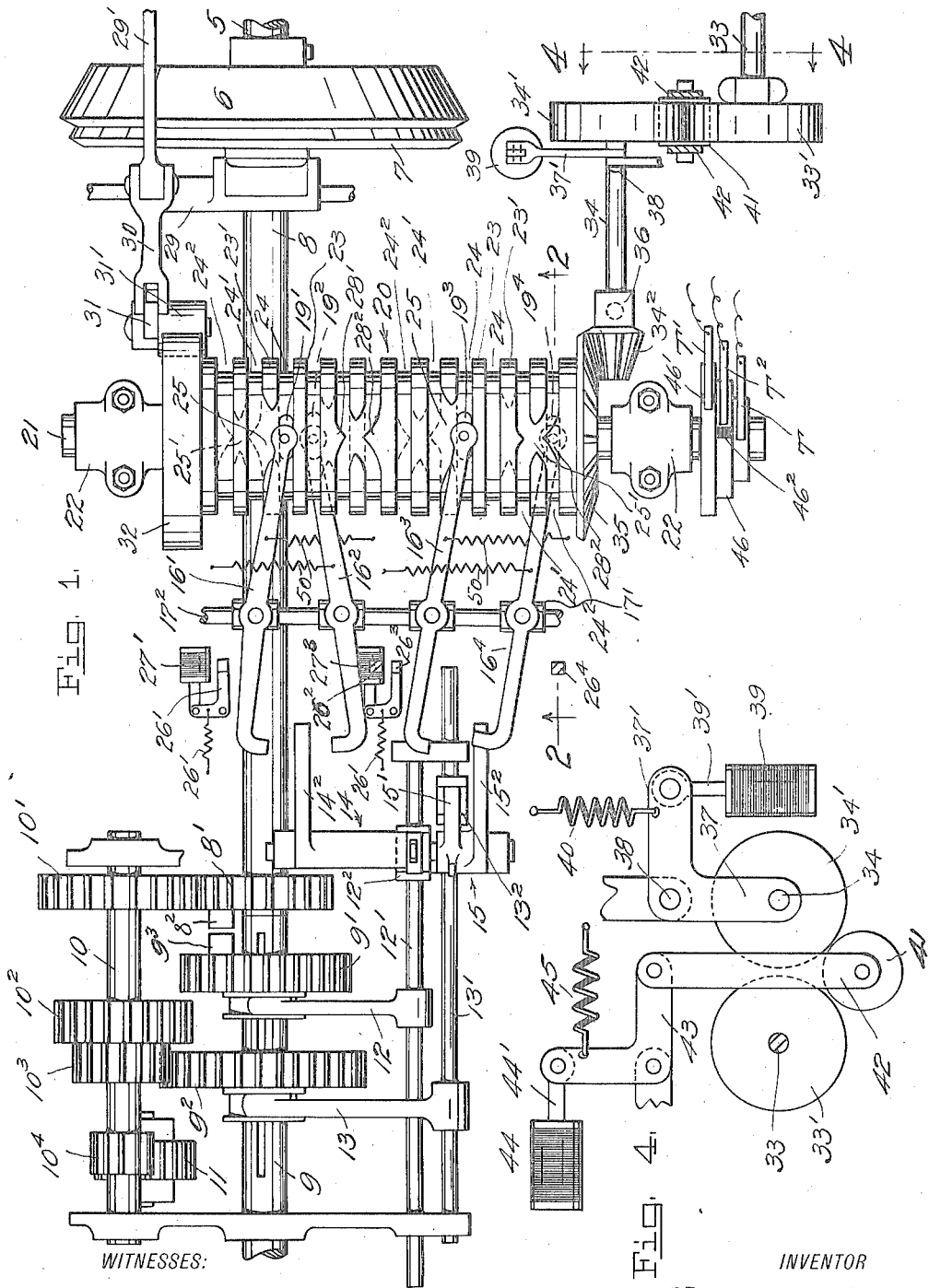
Figure 2:
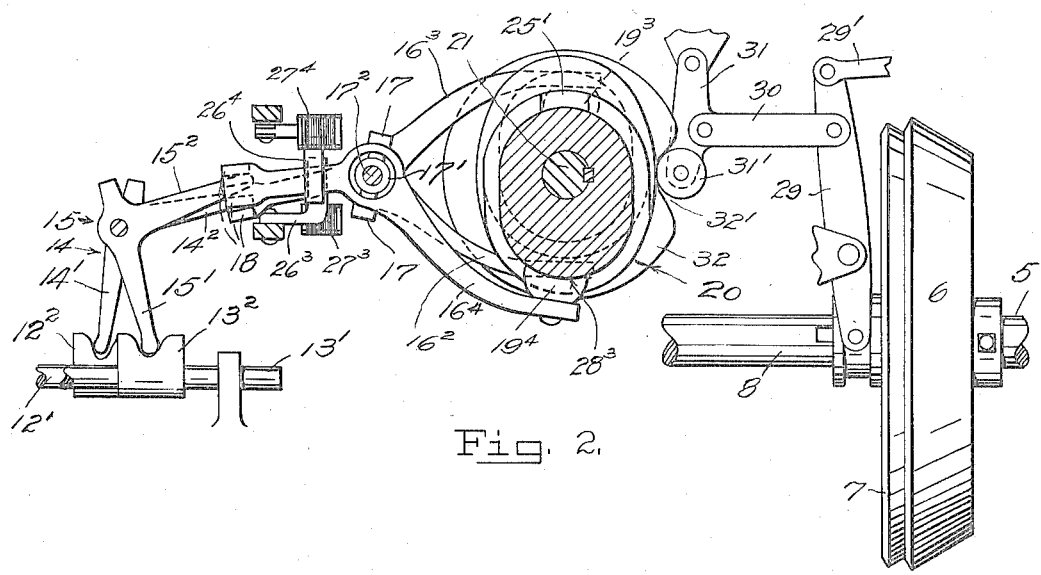
Figure 3:
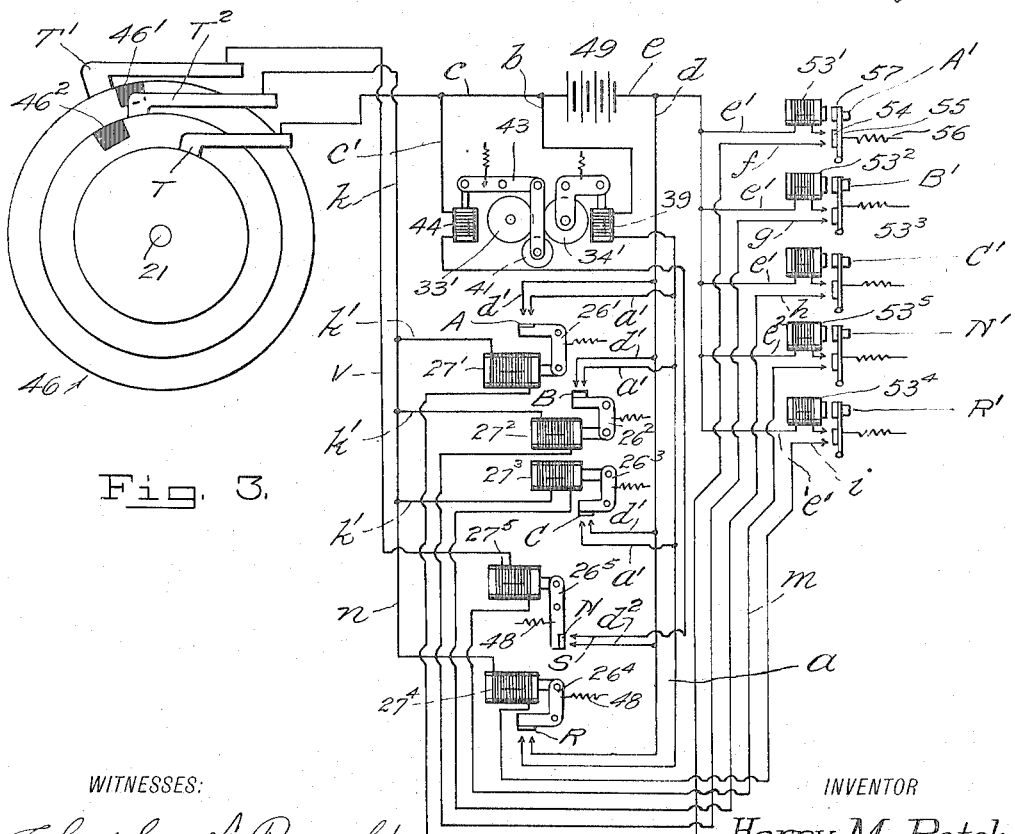

In the accompanying drawings, Figure 1 is a plan view with parts omitted to illustrate the driving mechanism for an automobile with the devices for controlling the gear shifters and the clutch control applied thereto. Fig. 2 is a vertical sectional view taken substantially through 2—2 of Fig. 1. Fig. 3 is a diagrammatic view of the circuit connections adapted to the carrying out of the invention. Fig. 4 is a detail vertical section on line 4—4 of Fig. 1.

Referring to Fig. 1 of the drawings, 5 represents a motor shaft provided with a clutch element 6 which is engageable by a clutch element 7 upon a second shaft 8 for rotating the latter when said clutch is coupled. The shaft 8 is arranged in axial alinement with a third shaft 9 which may be driven in unison therewith or at various relative speeds through the medium of gears provided on the shafts 8 and 9 and a so-called intermediate shaft 10. The above mentioned devices may be of usual or suitable type of automobile driving mechanism having change-speed gearing.

As illustrated, the intermediate shaft 10 is rotated by spur-gears $10^1$ and $8^1$ from the shaft 8.

Splined to shaft 9 are gears $9^1$ and $9^2$ so that the gear $9^1$ may be axially moved into couple with the gear $8^1$ or into mesh with a gear $10^2$ on the intermediate shaft, while the gear $9^2$ may be moved into mesh with another gear $10^3$ on the intermediate shaft or with a reverse gear 11 which, in turn, is in mesh with a gear $10^4$ of the shaft 10.

12 and 13 represent shifter arms carried by longitudinally movable rods $12^1$ and $13^1$ which are actuated by the devices embodying the present invention, to effect predetermined speed changes to the shaft 9.

In carrying out the invention I provide bell-crank levers 14 and 15 journaled for oscillatory motion on a transverse bar and having depending arms $14^1$ and $15^1$ (Fig. 2) engaging in slotted collars $12^2$ and $13^2$ which are formed or rigidly secured to the respective shifter rods. The other arms $14^2$ and $15^2$ of these levers are directed forwardly or toward the right in Figs. 1 and 2, so as to be engageable by the operating levers $16^1$, $16^2$, $16^3$ and $16^4$. These levers intermediate their lengths are mounted for horizontal swinging movements on gimbals 17 of sleeves $17^1$ which are rotatable upon a transverse supporting bar $17^2$. The rearwardly extending arms of said operating levers are bifurcated by the provision of fingers, such as indicated by 18. The other arms of the operating levers have pivotally connected thereto blocks $19^1$, $19^2$, $19^3$ and $19^4$.

20 represents a drum having a transversely arranged axle 21 journaled in bearings 22 and provided with a series of peripheral grooves for each of the operating levers and serve as guideways for the blocks thereof.

The various series of grooves are separated by annular ridges 23 against which the blocks of the levers, when unemployed, are yieldingly held by springs 50, Fig. 1. Each such series is comprised of three grooves, two of which, 24 and $24^1$, are concentric to the axis of the drum, and the third groove $24^2$, is eccentric thereto. A ridge $23^1$ intermediate the grooves 24 and $24^1$ is provided with a passageway 25 and diametrically opposite to such way a passageway $25^1$ is provided in the ridge $23^2$, which is between the grooves $24^1$ and $24^2$. As represented by section in Fig. 2, the major axis of the drum taken through a groove $24^2$ is medial to a passageway $25^1$ and with its major radius remote from said way through which a block enters the eccentric groove.

The springs 50 are arranged in inclined positions so that they tend to swing the lever arms connected thereto toward the respective ridges 23, and also act to yieldingly pull the blocks $19^1$, $19^3$ downwardly and the blocks $19^2$ and $19^4$ upwardly against the peripheral surfaces within the respective grooves of the drum.

Associated with the respective operating levers are bell-cranks $26^1$, $26^2$, $26^3$ and $26^4$ which are operated by solenoids $27^1$, $27^2$, $27^3$ and $27^4$ to swerve the respective operating levers laterally and cause the blocks thereof to pass through the ways 25 into the groove $24^1$, whereupon the rotation of the drum will present protuberances $28^1$ to the blocks and serve in coöperation with a protuberance $28^2$ provided in the grooves $24^2$ to direct the blocks into the latter and simultaneously cause an arm $14^2$ or $15^2$ of levers 14 or 15 to be engaged between the fingers 18 of an operating lever. The continued turning of the drum will cause the block to mount the outer or prolate portion $28^3$ (Fig. 2) of an eccentric groove to elevate or depress, as the case may be, the adjacent arm of an operating lever to afford a contrary movement of the opposite arm thereof to correspondingly swing a lever, 14 or 15, to impart endwise movement to a shifting rod and arm.

The clutch element 7 is normally in couple with the element 6 to rotate the shaft 8 from which are driven the change-speed gears. When one of the latter is to be shifted for a change of speed, it is desirable that the clutch be rendered temporarily inoperable. To accomplish this, I connect the axially movable clutch-member 7 by means of a lever 29 and link 30, with a lever 31 which carries a roller $31^1$ adapted to track against a cam 32. This cam is formed on or secured to the drum to rotate therewith and in its periphery has a recess $32^1$ which is presented in position to receive the roller $31^1$ when the rotation of the drum is arrested, whereupon the clutch members are in couple.

When the roller is tracking on the concentric portion of the cam, the lever 31 is influenced to separate the clutch members and is thereby rendered incapable of rotating the change gears. The drum is rotated through mechanism which I will now describe, from a power-driven shaft 33 which may be the pump-shaft or the valve-operating cam shaft of the automobile engine.

As shown in Figs. 1 and 4, such driving mechanism comprises a friction-driving wheel $33^1$ on the power-shaft 33, a driven friction wheel $34^1$ on an end of a shaft 34 which has on its other end a bevel tooth-pinion $34^2$ which is in mesh with a bevel tooth-gear 35 on the axle of the drum 20.

The shaft 34 has near one end a bearing in a swivel box 36 while near its other end it is journaled in the depending arm 37 of a bell-crank which is itself pivotally supported by a fulcrum-pin 38. The other arm 37 of said bell-crank is connected to the movable core $39^1$ of a solenoid magnet 39 whereby the wheel $34^1$ may be frictionally engaged with the wheel $33^1$ to impart rotary motion to the shaft 34, when the drum is to be rotated. When the magnet 39 is demagnetized, a spring 40 serves to disengage the two wheels. To drive the drum oppositely to that attained through medium of the two aforesaid friction wheels, I employ a third wheel 41 to act as an intermediary. This intermediate wheel is supported by links 42 from a lever 43 which, as shown in Fig. 4, is connected with the core element $44^1$ of a solenoid 44 which, upon being magnetized, will elevate the wheel 41 into frictional engagement with the friction wheels $33^1$ and $34^1$ in opposition to a spring 45.

Rotatable upon the drum axle 21 is a wheel 46, see Figs. 1 and 3, of metal or other good electrical conducting material, and inserted within the periphery thereof are spaced insulating blocks $46^1$ and $46^2$ which serve as circuit breakers for the brush $T^1$ or $T^2$ with respect to a brush T.

$27^5$ represents the magnet of a solenoid having its core connected to a lever $26^5$. The latter and the bell-crank levers $26^1$, $26^2$, $26^3$ and $26^4$, as shown in Fig. 3, are provided with closures N, A, B, C and R for terminals of normally incomplete circuits when the various electro-magnets are magnetized and when the same are demagnetized the levers are influenced by springs, as 48, to open such circuits by the withdrawal of said closures.

One of the terminals of each of these circuits is connected by wire $a$ and branches $a^1$ with the winding of the magnet 39 which is connected by wire $b$ with wire $c$ leading from the brush T to a pole of battery 49. The complementary terminals of the circuits pertaining to closures A, B, C and R are connected by wire $d$ and branches $d^1$ with a circuit wire $e$ connected to the opposite pole of the battery. The wire $e$ is connected by branches $e^1$ with the windings of magnets $53^1$, $53^2$, $53^3$ and $53^4$ which are included in normally incomplete circuits whose other leads $f$, $g$, $h$ and $i$ are respectively connected to the windings of magnets $27^1$, $27^2$, $27^3$ and $27^4$ which, in turn, are connected by wire $k$ and branches $k^1$ with the brush $T^2$. A branch $e^2$ also connects wire $e$ with the winding of magnet $53^5$ and thence by wire $m$ with the winding of magnet $27^5$ which is connected by wire $e$ with the brush $T^1$.

The leads from the magnets $53^1$, $53^2$, $53^3$, $53^4$, and $53^5$ are formed with gaps for which are provided switches consisting of closures 54 carried on arms 55 and yieldingly held out of contact with the terminals in the leads by springs 56. Said arms are provided with armatures 57 for the respective magnets and are actuated by push buttons $A^1$, $B^1$, $C^1$, $N^1$ and $R^1$ to complete the respective circuits. The magnet 44 is connected in the circuit of the battery by wires $c^1$ and $c$ and thence by wires $e$ and $d$ to a branch $d^2$, forming a terminal complementary to that of a wire S extending back to the winding of magnet 44.

The gap closure N for the two last-named terminals is carried by a lever $26^5$ connected to the core of solenoid magnet $27^5$ which is connected by wire V to the brush $T^1$ and also by the wire $m$ with a terminal arranged to be brought into circuit with the winding of magnet $53^5$ when the button $N^1$ is used.

The operation of the invention will be understood from an explanation as to the manner of shifting one of the change-speed gears:

By pressing on button $A^1$, for example, the circuit which includes the winding of magnet $53^1$ is closed by a conductor 54 bridging the gap between terminals of $e^1$ and $f^1$ resulting in the magnet becoming energized to hold the arm 55 through the office of an armature 57. The current through such closed circuit is as follows, from battery 49 through lead $c$ to brush T and wheel 46 to brush $T^2$, thence by leads $k$ and $k^1$ through winding of solenoid magnet $27^1$ and lead $f$ to magnet $53^1$ and back to battery by leads $e^1$ and $e$.

The solenoid $27^1$ is accordingly magnetized to actuate the bell-crank $26^1$ to swing operating lever $16^1$ in opposition to a spring 50 from neutral groove 24 of the drum 20 into a second groove $24^1$. As this occurs, the closure A closes the gap between leads $a^1$ and $d^1$ of a circuit which includes battery 49 and the winding of solenoid 39, whereby the latter is magnetized to cause the friction wheel $34^1$ to be swung into frictional engagement with driving wheel $33^1$ to effect, through the medium of gears $34^2$ and 35, a rotation of the drum and the wheel 46.

During the early part of the drum's rotation, the cam 32 effects, by means of levers 31 and 29, the disengagement of the clutch member 7 whereupon the shaft 8 and the change-speed gears become idle. In the subsequent turning of the drum the block $19^1$ of lever $16^1$ is directed by the ridges to cause it to pass through opening $25^1$ into groove $24^2$ coincidentally with the swinging of the referred to lever into position to embrace the arm $14^2$ of a gear-shifting lever, and in the continued turning of the drum the block $19^1$ is thrust radially outward by the eccentricity of the groove $24^2$ whereby the lever arm $14^1$ is swung to effect the shifting of the gear $9^1$ toward the gear $8^1$ to have the same engaged through the instrumentality of the lugs $9^3$ and $8^2$. As this occurs, the cam 32 is in position to present the recess $32^1$ to the roller $31^1$ and the levers 31 and 29 are swung by the usual spring (not shown) within the clutch to allow the coupling of the members 6 and 7 thereof and the operation of the shaft $8^1$ together with the driven mechanism controlled thereby.

At the completion of the rotation of the wheel 46, the insulation $46^2$ passes under the contact end of the brush $46^2$ to break the electric circuit which embraces the solenoid $27^1$ which, becoming demagnetized, releases the core thereof whereupon the connected spring 48 asserts its power to cause the bell-crank $26^1$ to withdraw the circuit closure A from the circuit in which is embraced the solenoid 39 which thus becomes demagnetized with a consequent withdrawal of the friction wheel $34^1$ from $33^1$ and a discontinuance in the rotation of the drum 20 and wheel 46.

The magnet $53^1$ which is also in a circuit including the brushes T and $T^1$ is also demagnetized by the latter passing over circuit breaker $46^2$ resulting in the associated arm 54 being released and affected by the connected spring 56 to withdraw the gap closure on the arm into inoperative position.

To effect another alteration in the relative positions of the change-speed gears, a selected one of the buttons, as $C^1$, is manipulated to close the circuit of the leads $e^1$ and $h$, resulting in the flow of current through the magnet $27^3$ and the swinging of the bell-crank $26^3$ to urge the operating lever $16^3$ into position to be engaged in a drum-groove $24^1$ and, as explained above, the drum 20 is rotated to not only swing the referred to lever into operative position, but likewise returns the block $19^1$ of the previously used lever into its groove $24^1$ whence it is returned to neutral position in a groove 24 by a spring 50.

In thus turning the drum, the eccentricity of a groove $24^2$ allows a spring 50 to impart a downward movement to the arm of lever $16^1$ with which the spring is connected with an upward swing to the lever arm, which is connected to the lever 14 thereby imparting endwise movement to rod $12^1$ and the uncoupling of gear-wheels $9^1$ and $8^1$. This disengagement of the previously engaged gear-wheels obviously occurs before any other of the change-speed wheels can be brought into engagement.

Instead of shifting the gears, as above explained, a gear may be moved out of engagement so that all may remain in neutral or unengaged positions, to which end the button $N^1$ is manipulated to close circuit including brushes T and $T^1$ and solenoid magnet $27^5$, resulting in the drum being rotated to restore a previously used operating lever into a groove $24^1$ and thence by the agency of a spring 50 into a neutral groove 24 where it remains until again required.

By the use of the circuit controlled by button $R^1$, the magnet 44 is magnetized to cause the intermediate wheel 41 to be brought into engagement with the wheels $34^1$ and $33^1$ resulting in the drum being rotated in a reverse direction.

By such devices it is apparent that the blocks 19¹, 19², etc., are backed, so to speak, into neutral grooves, and means are afforded for restoring a change-speed gear to its original position, should it be prevented from meshing with another.

What I claim, is—

1. Change-speed gear apparatus for automobiles, comprising speed-gear shifters, controlling levers therefor, mechanical means for actuating said levers, power-operated means for driving the aforesaid means, and electro-magnetic devices comprising manually controlled electric switches whereby said levers may be selectively placed in operative relation with said means.

2. Change-speed gear apparatus for automobiles, comprising a series of gear-shifting devices, power-driven rotary means for actuating said devices, and manually-controlled electro-magnetic devices for selectively causing said gear-shifting devices to be subject to the action of said rotary means.

3. Change-speed gear apparatus for automobiles, comprising speed-gear shifting devices, a drum, means to drive the drum in selected rotary directions, and electro-magnetic means for positioning said devices so as to be actuated by the drum to shift selected change-speed gears.

4. Change-speed gear apparatus for automobiles, comprising speed-gear shifting devices, a drum, means to drive the drum in selected rotary directions, electro-magnetic means for positioning said devices so as to be actuated by the drum to shift selected change-speed gears, and electro-magnetic means for regulating the action of the aforesaid electro-magnetic means and also serving to control the actions of the drum-driving means.

5. Change-speed gear apparatus for automobiles, comprising gear-shifters, mechanical means for operating the gear-shifters, electro-magnetic means including push-buttons for operating said means and causing selected ones of said gear-shifters to be in operative or inoperative relation with respect to said mechanical means, and clutch mechanism arranged to be uncoupled by said mechanical means when the latter effects the operation of a gear-shifter.

6. Change-speed gear apparatus for automobiles, comprising gear-shifters, mechanical means for actuating said gear-shifters, power-operated devices for operating said mechanical means, electro-magnets and devices actuated by said electro-magnets whereby a selected gear-shifter is first rendered subject to the action of said mechanical means whereupon the electro-magnetic means causes said power devices to actuate the mechanical means to operate the selected gear-shifter.

7. In change-speed gear apparatus for automobiles, the combination with the gear-shifting devices and a member through which power is transmitted to said devices, of mechanism for actuating said member, electro-magnets controlling said actuating mechanism, and push-buttons connected with said electro-magnets whereby said actuating mechanism may be rendered operative to actuate a selected gear shifter.

8. In change-speed gear apparatus for automobiles, the combination with the gear-shifting devices, a clutch, clutch-operating mechanism, and a member through which power is transmitted for operating said devices and regulating the action of the clutch mechanism, devices actuated by said member to shift the clutch, of electric means for primarily moving a selected one of said gear shifting devices into position to be operable by said member whereupon said member is actuated to operate such device coincidently with the disengagement of the clutch and finally allow the coupling of the clutch.

9. In change-speed gear apparatus for automobiles, the combination with the driving motor of an automobile, and change-speed gearing associated therewith, of gear-shifting levers operatively connected with said gears, a rotary drum formed with cam-surfaces arranged to influence the movements of said levers, driving connections between said drum and said motor, and manually-actuated devices for rendering said driving connections operative.

10. In change-speed gear apparatus for automobiles, the combination with the driving motor of an automobile, change-speed gearing associated therewith, and a clutch interposed between said motor and said gearing, of gear-shifting levers operatively connected with said gears, a rotary drum formed with cam-surfaces arranged to influence the movements of said levers, driving connections between said drum and said motor, and manually-actuated devices for rendering said driving connections operative, said drum being provided with means to disengage said clutch during the rotary movements of the drum.

11. In change-speed gear apparatus for automobiles, the combination with the driving motor and change-speed gearing associated therewith, of a rotatably mounted drum, driving connections between said motor and said drum, means whereby the operator may render said driving connections operative, normally inoperative gear-shifting connections between said gears and said drum, and means whereby selected ones of said connections may be set to shift a predetermined gear into operative position, 12. The combination with a motor of change speed gears associated therewith, shafting connecting said motor and said change speed gears, a clutch interposed in said shafting, a drum having peripheral grooves, shifting devices connected with said gears, means engageable within said peripheral grooves for moving said shifting devices in response to the rotation of said drum, a cam wheel on said drum and means actuated by said cam wheel for automatically disengaging said clutch during the shifting movement of a gear.

13. The combination with a motor of change speed gears associated therewith, shafting connecting said motor and said change speed gears, a clutch interposed in said shafting, a drum having peripheral grooves, electrically controlled devices for rotating said drum, means carried by said drum for rendering said electrically controlled devices inoperative upon each complete rotation of said drum, shifting devices connected with said gears, means engageable within said peripheral grooves for moving said shifting devices in response to the rotation of said drum, a cam wheel on said drum and means actuated by said cam wheel for automatically disengaging said clutch during the shifting movement of a gear.

Signed at Seattle, Wash., this 20th day of September, 1914.

HARRY M. PATCH.

Witnesses:
  HORACE BARNES,
  E. PETERSON.